United States Patent
Itoh

(10) Patent No.: US 7,545,972 B2
(45) Date of Patent: Jun. 9, 2009

(54) TEST TUBE TYPE DISCRIMINATION APPARATUS

(76) Inventor: Teruaki Itoh, 5-25, Kokaihommachi, Kumamoto-shi, Kumamoto-ken (JP)

(*) Notice: Subject to any disclaimer, the term of this patent is extended or adjusted under 35 U.S.C. 154(b) by 724 days.

(21) Appl. No.: 10/686,630

(22) Filed: Oct. 17, 2003

(65) Prior Publication Data

US 2004/0086173 A1 May 6, 2004

(30) Foreign Application Priority Data

Oct. 31, 2002 (JP) .............................. 2002-318703

(51) Int. Cl.
*G06K 9/00* (2006.01)
(52) U.S. Cl. ........................................ 382/142
(58) Field of Classification Search ................ 382/218, 382/100, 142; 250/223, 223 B; 348/127
See application file for complete search history.

(56) References Cited

U.S. PATENT DOCUMENTS

| | | | | |
|---|---|---|---|---|
| 3,202,761 A | * | 8/1965 | Bibbero | 704/251 |
| 4,244,650 A | * | 1/1981 | Garfunkel et al. | 356/71 |
| 4,459,487 A | * | 7/1984 | Leser | 250/559.22 |
| 4,467,212 A | * | 8/1984 | Olcott | 250/497.1 |
| 4,691,231 A | * | 9/1987 | Fitzmorris et al. | 348/127 |
| 4,912,318 A | * | 3/1990 | Kajiura et al. | 250/223 B |
| 4,914,289 A | * | 4/1990 | Nguyen et al. | 250/223 B |
| 5,204,911 A | * | 4/1993 | Schwartz et al. | 382/142 |
| 5,583,337 A | * | 12/1996 | Chan | 250/330 |
| 5,926,268 A | * | 7/1999 | Bonewitz et al. | 356/240.1 |
| 5,926,556 A | * | 7/1999 | Douglas et al. | 382/142 |
| 6,519,356 B1 | * | 2/2003 | Hooker et al. | 382/143 |
| 6,525,333 B1 | * | 2/2003 | Hooker et al. | 250/559.45 |
| 6,571,934 B1 | * | 6/2003 | Thompson et al. | 198/619 |

FOREIGN PATENT DOCUMENTS

| | | |
|---|---|---|
| JP | 3-96841 | 4/1991 |
| JP | 4-4265 | 1/1992 |
| JP | 6-320052 | 11/1994 |
| JP | 10-216640 | 8/1998 |
| JP | 2001-239221 | 9/2001 |
| JP | 2002-90374 | 3/2002 |
| JP | 2002-247436 | 8/2002 |
| JP | 2002-273271 | 9/2002 |
| JP | 2003-506678 | 2/2003 |
| WO | WO 01/09593 A1 | 2/2001 |

* cited by examiner

*Primary Examiner*—Matthew C Bella
*Assistant Examiner*—Dennis Rosario
(74) *Attorney, Agent, or Firm*—Nixon & Vanderhye P.C.

(57) ABSTRACT

A test tube type discrimination apparatus includes first and second electronic cameras which pick up images of a plurality of test tubes. The first electronic camera picks up an image from an opening of each of the test tubes, and the second electronic camera picks up an image from a side thereof. A pattern recognition unit receives data of the images picked up by the first and second electronic cameras and extracts an edge of each of the images to recognize a test tube pattern of each of the test tubes including opening and side patterns of each of the test tubes. A standard pattern memory stores the opening and side patterns of the test tubes as standard patterns, and a comparison determination unit compares the test tube pattern and the standard patterns to determine a type of each of the test tubes.

3 Claims, 1 Drawing Sheet

TEST TUBE TYPE DISCRIMINATION APPARATUS

CROSS-REFERENCE TO RELATED APPLICATIONS

This application is based upon and claims the benefit of priority from the prior Japanese Patent Application No. 2002-318703, filed Oct. 31, 2002, the entire contents of which are incorporated herein by reference.

BACKGROUND OF THE INVENTION

1. Field of the Invention

The present invention relates to a test tube type discrimination apparatus for discriminating a type of each of a plurality of test tubes held in a test tube rack.

2. Description of the Related Art

There are different types of test tubes that differ in diameter and length as specimen containers that contain specimens such as blood. These test tubes are sorted by type and stored at least in the initial state before they are used. In most cases, however, when a once-used test tube is sterilized for reuse, different types of test tubes are mixed in one test tube rack.

In order to put the test tubes for blood test to actual use, they should be sorted in advance by type. When the test tubes greatly differ in outside diameter or the like, an operator can visually sort them almost correctly. However, when the outside diameters of the test tubes are almost the same and the shapes of the openings thereof are slightly different, or when the outside diameters of the test tubes are the same in proximity to the openings and only the degrees of taper of tapered portions of the test tubes are different, an operator cannot make a correct visual discrimination.

It is thus desired to provide a test tube type discrimination apparatus for automatically discriminating the types of a plurality of test tubes held in a test tube rack.

BRIEF SUMMARY OF THE INVENTION

An object of the present invention is to provide a test tube type discrimination apparatus having the following advantages.

1) The apparatus can correctly discriminate a type of each of a plurality of test tubes held in a test tube rack.

2) The apparatus can perform the discrimination operation in a short time.

In order to attain the above object, a test tube type discrimination apparatus according to an aspect of the present invention has the following characteristic configuration. The other characteristic configurations will be clarified in the embodiments later.

A test tube type discrimination apparatus according to an aspect of the present invention, comprises first and second electronic cameras which pick up images of a plurality of test tubes held in a test tube rack one by one, the first electronic camera picking up an image from an opening of each of the test tubes and the second electronic camera picking up an image from a side thereof, a pattern recognition unit which receives data of the images picked up by the first and second electronic cameras and extracts an edge of each of the images to recognize a test tube pattern of each of the test tubes including opening and side patterns of each of the test tubes, a standard pattern memory which stores the opening and side patterns of the test tubes as standard patterns, and a comparison determination unit which compares the test tube pattern recognized by the pattern recognition unit and the standard patterns of the test tubes stored in the standard pattern memory to determine a type of each of the test tubes.

DETAILED DESCRIPTION OF THE INVENTION

FIRST EMBODIMENT

Figure 1:
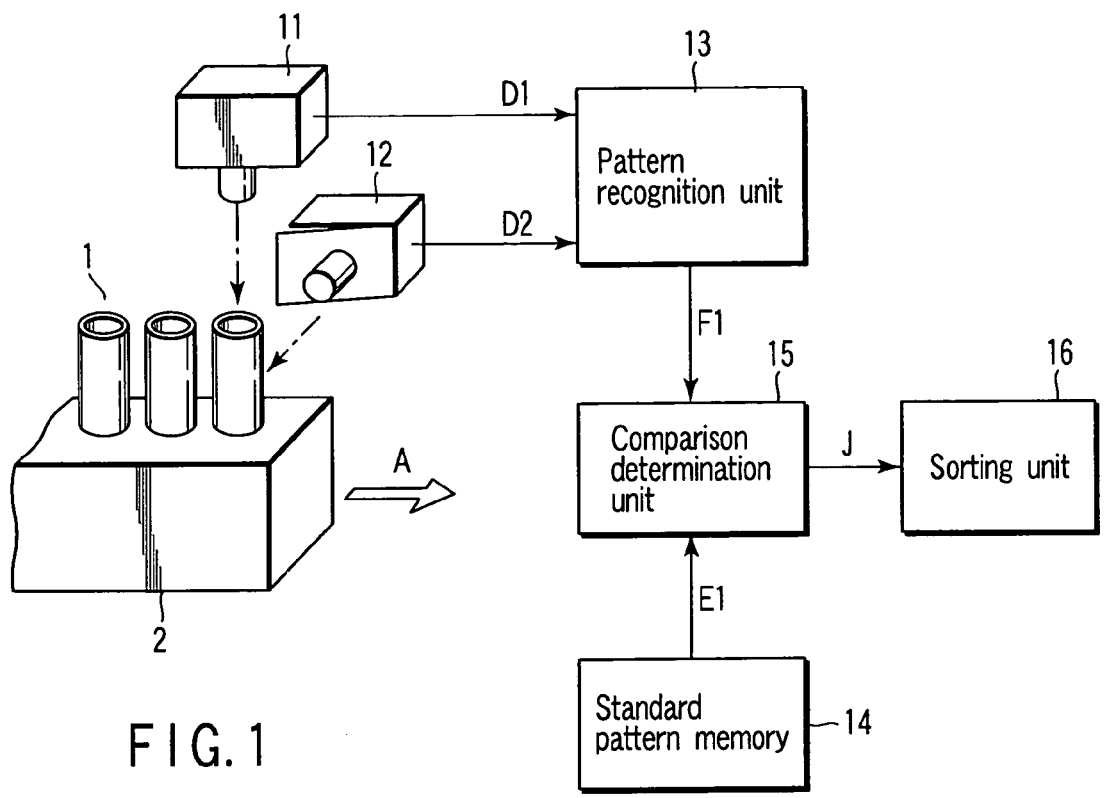
FIG. 1 is a block diagram showing a test tube type discrimination apparatus according to a first embodiment of the present invention.

FIG. 1 is a block diagram showing a test tube type discrimination apparatus according to a first embodiment of the present invention. Referring to FIG. 1, a plurality of test tubes 1 are held in a test tube rack 2 in a row in the conveyance direction. The test tube rack 2 is conveyed in the direction indicated by arrow A along a conveyance path (not shown). First and second electronic cameras 11 and 12 are located in given positions close to the conveyance path. Both of the cameras 11 and 12 are electronic cameras each employing a CCD (charge coupled device) as an image pickup device. The first and second electronic cameras 11 and 12 pick up images of the test tubes 1 held in the test tube rack 2 one by one. The first electronic camera 11 picks up an image from the opening of each of the test tubes 1 and the second electronic camera 12 picks up an image from the side thereof. Data items D1 and D2 of each of the images of the test tubes 1, which are picked up by the electronic cameras 11 and 12, are transmitted to a pattern recognition unit 13. The unit 13 processes the data items D1 and D2 and extracts an edge of each image to recognize a test tube pattern F1 including the opening and side patterns of each of the test tubes 1.

A standard pattern memory 14 previously stores the opening and side patterns of the test tubes 1 as standard patterns E1. A comparison determination unit 15 compares the test tube pattern F1 recognized by the pattern recognition unit 13 with the standard patterns E1 to determine a type of each of the test tubes 1 and then store the determination result in a built-in memory.

A sorting unit 16 sorts the test tubes 1 whose images have been picked up, based on sorting information J corresponding to the determination results of the comparison determination unit 15, and holds them in test tube supply racks (not shown) according to test tube type.

SECOND EMBODIMENT

Figure 2:
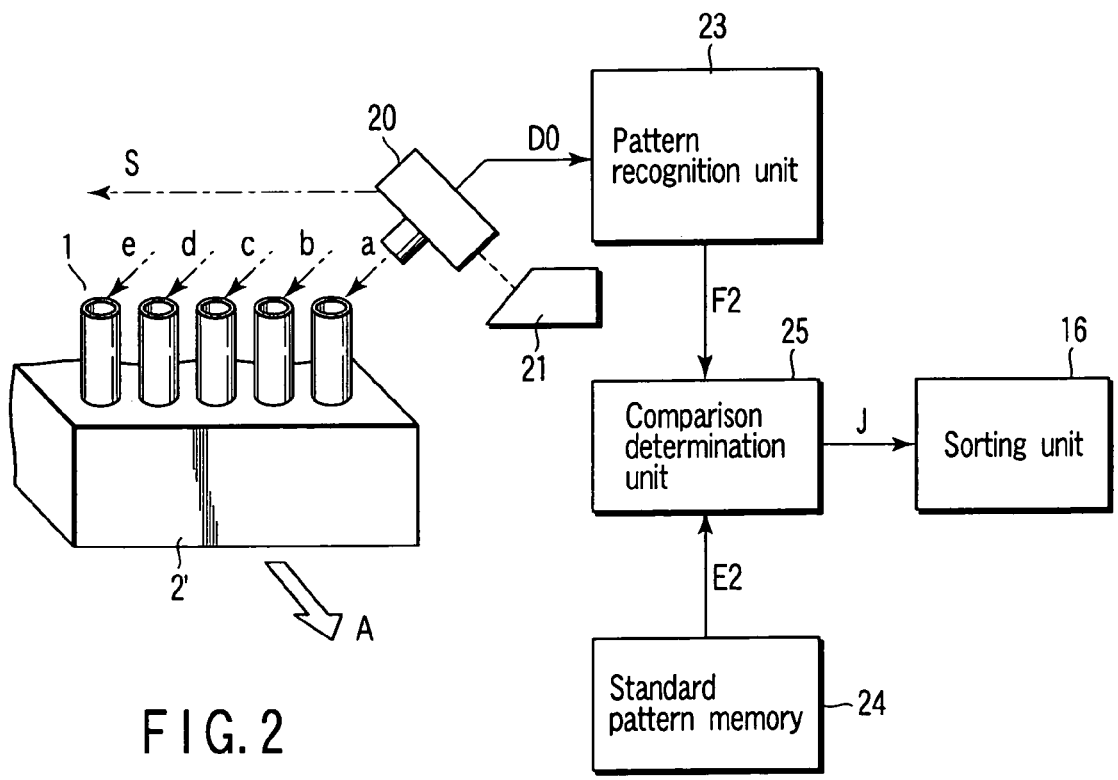
FIG. 2 is a block diagram showing a test tube type discrimination apparatus according to a second embodiment of the present invention.

FIG. 2 is a block diagram showing a test tube type discrimination apparatus according to a second embodiment of the present invention. The second embodiment differs from the first embodiment chiefly in that the apparatus of the second embodiment comprises a single electronic camera 20 that picks up an image of a test tube 1 from between the opening and side of the test tube 1.

Referring to FIG. 2, a plurality of test tubes 1 are held in a test tube rack 2' in five rows in the conveyance direction. The test tube rack 2' is conveyed in the direction indicated by arrow A along a conveyance path (not shown). A single electronic camera 20 is located in a given position close to the conveyance path. As in the first embodiment, the camera 20 is an electronic camera employing a CCD (charge coupled device) as an image pickup device.

The electronic camera 20 picks up images of the test tubes 1 held in the test tube rack 2' one by one at an angle set by an angle adjuster 21. In other words, an image is picked up from between the opening and side of each of the test tubes 1, or obliquely from above each of the test tubes 1. The electronic camera 20 and angle adjuster 21 can be moved in all directions at least within the horizontal plane above the test tube rack 2' by a moving mechanism (not shown).

The electronic camera 20 can thus pick up images of the test tubes 1 in the order denoted by a, b, c, d and e while moving in the direction perpendicular to the rack conveyance direction within the horizontal plane, as indicated by arrow S, above the test tube rack 2'. Repeating this operation allows a so-called scanning photography for the test tubes 1 held in matrix in the test tube rack 2'. The types of a number of test tubes 1 can thus be discriminated quickly.

Data D0 of each of the images of the test tubes 1 picked up by the photography is transmitted to a pattern recognition unit 23. The unit 23 processes the data D0 and extracts an edge of each of the images to recognize a test tube pattern F2 including an integral inclined pattern of the opening and side patterns of each of the test tubes 1.

A standard pattern memory 24 previously stores the integral inclined patterns of the opening and side patterns of the test tubes 1 as standard patterns E2. A comparison determination unit 25 compares the test tube pattern F2 recognized by the pattern recognition unit 23 with the standard patterns E2 to determine a type of each of the test tubes 1 and then store the determination result in a built-in memory.

A sorting unit 16 sorts the test tubes 1 whose images have been picked up, based on sorting information J corresponding to the determination result of the comparison determination unit 25, and holds them in test tube supply racks (not shown) according to test tube type.

FEATURES OF THE EMBODIMENTS

[1] A test tube type discrimination apparatus according to an embodiment, comprises:

first and second electronic cameras 11 and 12 which pick up images of a plurality of test tubes 1 held in a test tube rack 2 one by one, the first electronic camera 11 picking up an image from an opening of each of the test tubes and the second electronic camera 12 picking up an image from a side thereof;

a pattern recognition unit 13 which receives data of the images picked up by the first and second electronic cameras 11 and 12 and extracts an edge of each of the images to recognize a test tube pattern of each of the test tubes 1 including opening and side patterns of each of the test tubes 1;

a standard pattern memory 14 which stores the opening and side patterns of the test tubes 1 as standard patterns; and a comparison determination unit 15 which compares the test tube pattern recognized by the pattern recognition unit 13 and the standard patterns of the test tubes 1 stored in the standard pattern memory 14 to determine a type of each of the test tubes 1.

In the test tube type discrimination apparatus described above, the test tube pattern of a test tube 1 photographed by the first and second electronic cameras 11 and 12, which includes the opening and side patterns of the test tube 1, is compared with the opening and side patterns of each of the test tubes 1 stored in advance in the standard pattern memory 14 to discriminate a type of each of the test tubes 1 with high accuracy.

[2] A test tube type discrimination apparatus according to an embodiment, comprises:

a single electronic camera 20 which picks up images of a plurality of test tubes 1 held in a test tube rack 2 one by one from between an opening and a side of each of the test tubes 1;

a pattern recognition unit 23 which receives data of the images picked up by the electronic camera 20 and extracts an edge of each of the images to recognize a test tube pattern of each of the test tubes 1 including an integral inclined pattern of opening and side patterns of each of the test tubes 1;

a standard pattern memory 24 which stores integral inclined patterns of opening and side patterns of the test tubes 1 as standard patterns; and a comparison determination unit 25 which compares the test tube pattern recognized by the pattern recognition unit 23 and the standard patterns of the test tubes 1 stored in the standard pattern memory 24 to determine a type of each of the test tubes 1.

The foregoing test tube type discrimination apparatus can produce substantially the same advantages as those of the apparatus described in above item [1] using a single electronic camera 20. The apparatus can thus be manufactured at low cost. Since only one image is used for comparison, the comparison operation can be simplified and thus the time required to do so can be shortened. Moreover, the electronic camera 20 can take pictures while scanning in all directions within the horizontal plane above the test tube rack 2'. Therefore, even though a number of test tubes 1 are held in matrix in the test tube rack 2', their types can quickly be discriminated.

[3] In the test tube type discrimination apparatus according to one of items [1] and [2] described above, the electronic cameras 11, 12 and 20 each employ a CCD as an image pickup device.

[4] The test tube type discrimination apparatus according to one of items [1], [2] and [3] described above, further comprises a sorting unit 16 which sorts the test tubes 1 whose images are picked up, according to a type based on determination results of the comparison units 15 and 25.

What is claimed is:
1. A test tube type discrimination apparatus comprising:
a tube rack which holds test tubes arranged in a line, an opening of the tubes being held on top, the tube rack being conveyed in a direction corresponding to the line of the test tubes;
a first electronic camera which is located above the tube rack and picks up a top view image of each of the test tubes held in the tube rack,
a second electronic camera which is located at a side of the tube rack and picks up a side view image of each of the test tubes held in the tube rack, the first and second electronic cameras simultaneously picking up the top view image and the side view image;
an extracting unit which receives the top view image picked up by the first electronic camera and the side view image picked up by the second electronic camera and extracts a top view image edge and a side view image edge to recognize a test tube pattern of each of the test tubes, the test tube pattern including opening and side patterns;
a reference pattern memory which stores plural reference patterns each of which including a reference opening pattern and a reference side pattern of each of the test tubes of plural types; and
a comparison determination unit which compares the opening pattern and the side pattern recognized by the extracting unit with the reference opening pattern and the reference side pattern of each of the test tubes included in the plural reference patterns stored in the reference pattern memory to determine a type of each of the test tubes held in the tube rack.

2. The test tube type discrimination apparatus according to claim 1, wherein the first and second electronic cameras each employ a CCD as an image pickup device.

3. The test tube type discrimination apparatus according to claim 1, further comprising a sorting unit which sorts the test tubes whose images are picked up, according to a type based on determination results of the comparison unit.

* * * * *